United States Patent [19]
Hayes

[11] Patent Number: 5,806,459
[45] Date of Patent: Sep. 15, 1998

[54] BIRD FEED HOLDER

[76] Inventor: Philip A. Hayes, 164 N. Stevens, Orange, Calif. 92668

[21] Appl. No.: 634,859

[22] Filed: Apr. 19, 1996

Related U.S. Application Data

[63] Continuation of Ser. No. 391,596, Feb. 21, 1995, abandoned.

[51] Int. Cl.⁶ ..................................................... A01K 39/04
[52] U.S. Cl. ........................... 119/57.8; 119/465; 119/477
[58] Field of Search ..................................... 119/465, 466, 119/464, 477, 537, 51.03, 52.2, 52.3, 57.8, 57.9; 269/283, 104, 152; 24/338, 499

[56] References Cited

U.S. PATENT DOCUMENTS

| | | | |
|---|---|---|---|
| D. 103,963 | 4/1937 | Butler | 119/57.8 |
| 992,167 | 5/1911 | Cousin . | |
| 1,537,615 | 5/1925 | McConnell . | |
| 1,592,493 | 7/1926 | Kelly | 119/465 |
| 2,432,957 | 12/1947 | Webster | 24/338 |
| 2,504,282 | 4/1950 | Tobias . | |
| 2,518,549 | 8/1950 | Hyde | 119/464 |
| 2,717,577 | 9/1955 | Petsche . | |
| 3,119,372 | 1/1964 | Gantz . | |
| 3,273,537 | 9/1966 | Orr | 119/51.03 |
| 4,306,709 | 12/1981 | Hurn | 269/283 |
| 5,025,753 | 6/1991 | Schneider | 119/57.8 |
| 5,052,342 | 10/1991 | Schneider | 119/51.03 |
| 5,277,147 | 1/1994 | Dupuis . | |

FOREIGN PATENT DOCUMENTS

| | | | |
|---|---|---|---|
| 458810 | 12/1936 | United Kingdom | 119/51.03 |
| 960760 | 6/1964 | United Kingdom | 428/19 |

Primary Examiner—Todd E. Manahan
Attorney, Agent, or Firm—Lawrence S. Cohen

[57] ABSTRACT

A bird feed holder for holding an elongated bird treat such as a millet spray in a horizontal position. The bird feed holder includes mounting elements for mounting the holder on a cage in such position that gripping members are horizontally aligned and spaced apart. There is also a perch parallel to the gripping members so that the bird can access the bird treat.

36 Claims, 5 Drawing Sheets

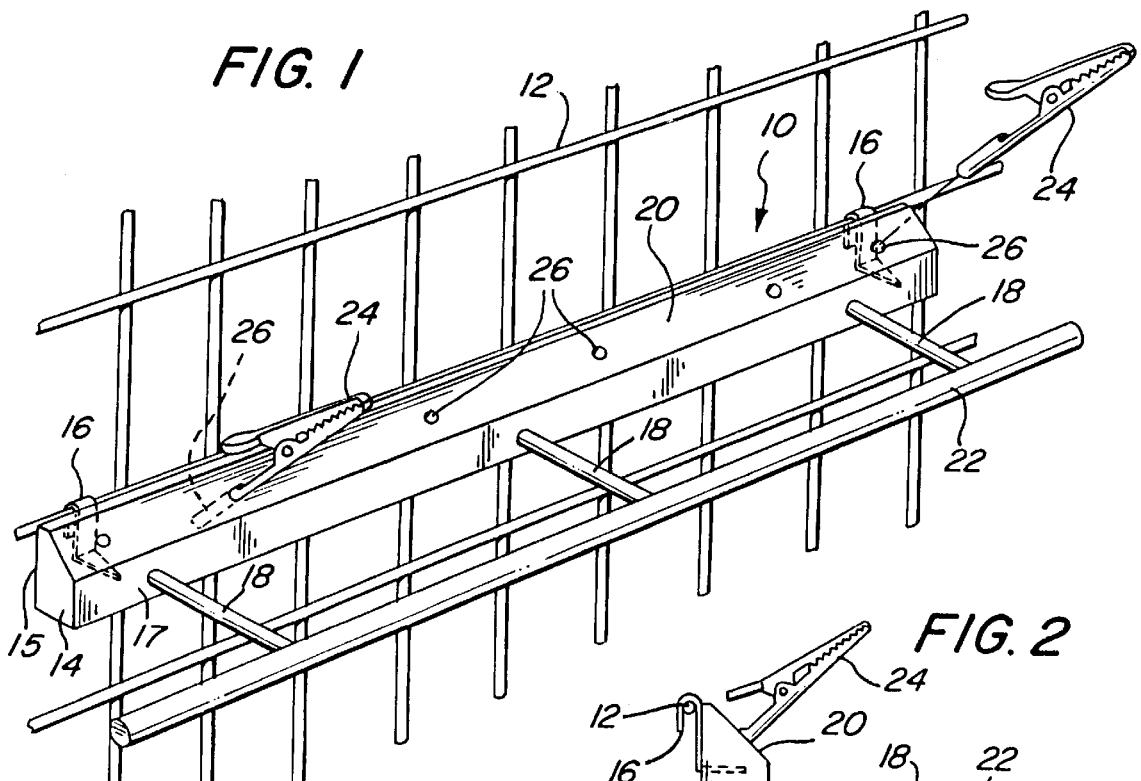
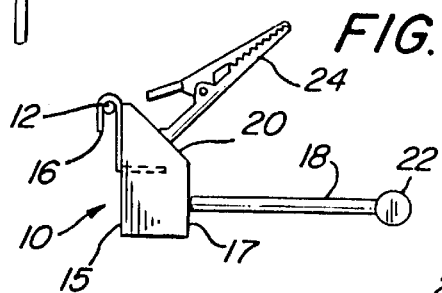
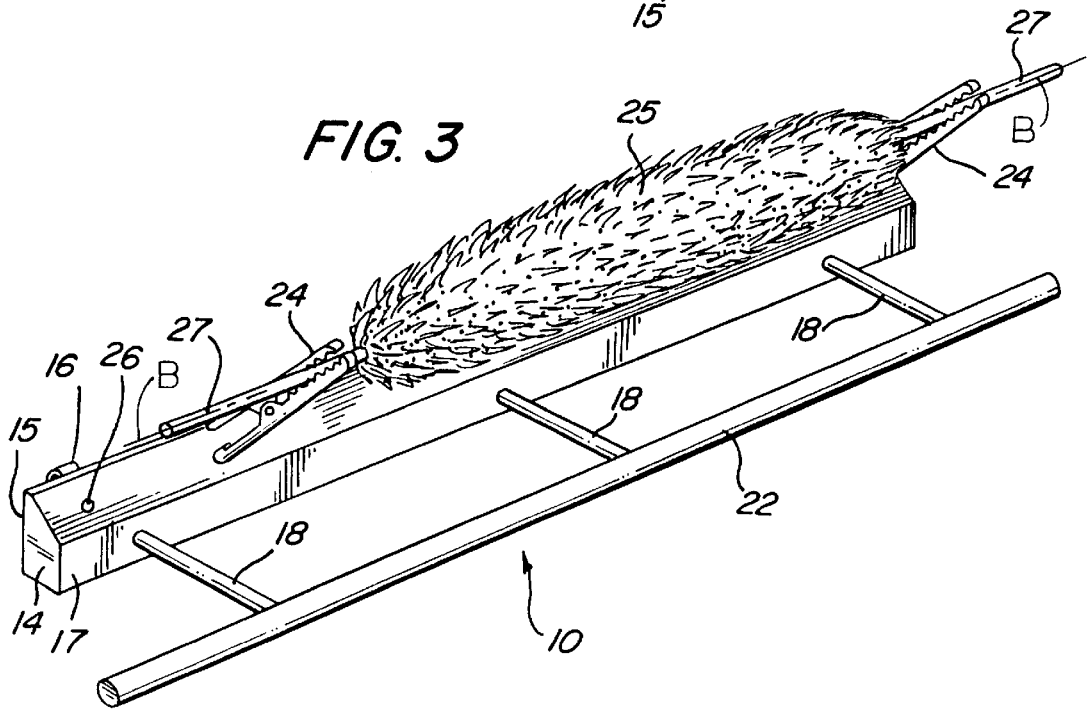

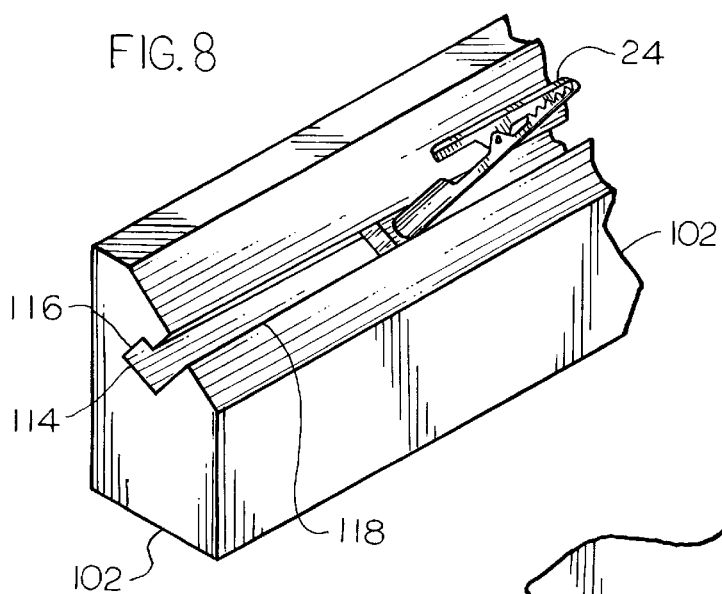
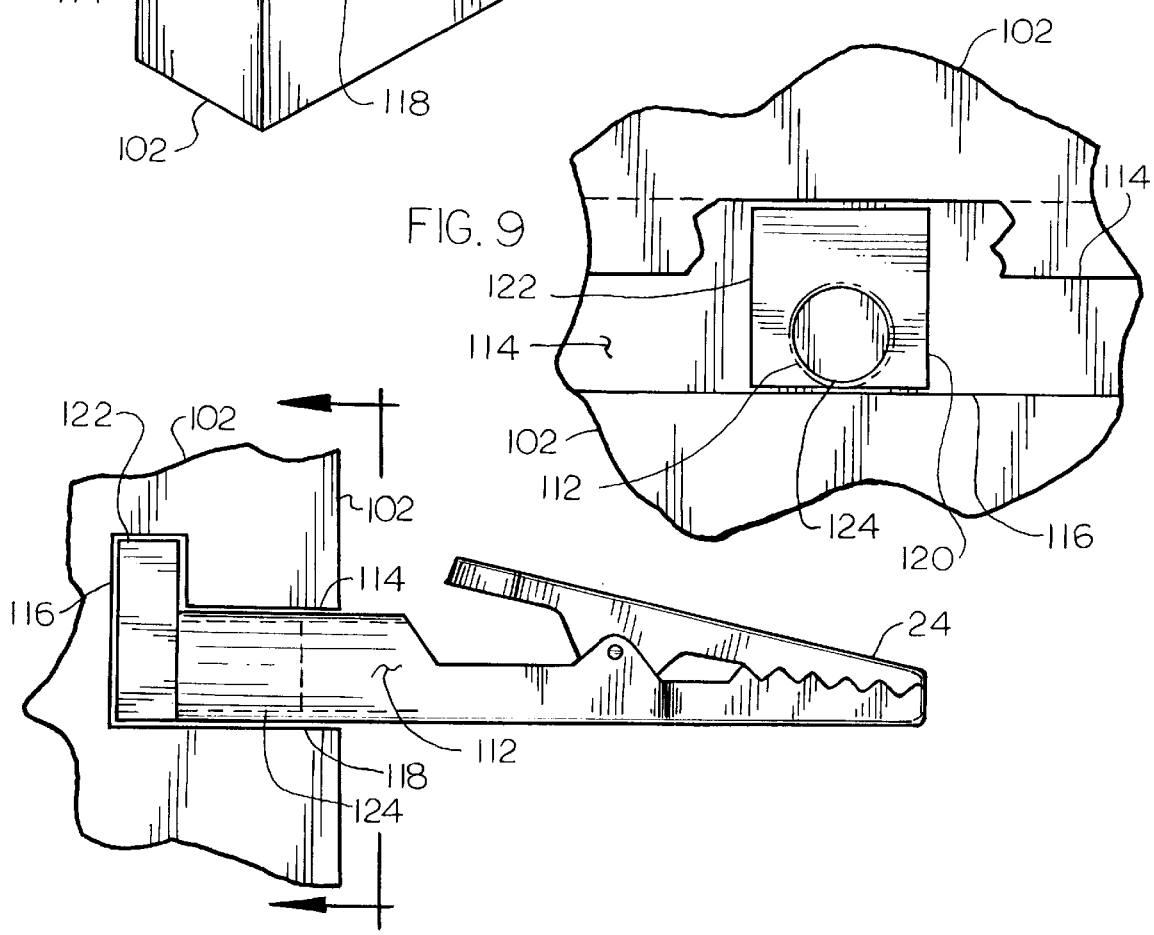
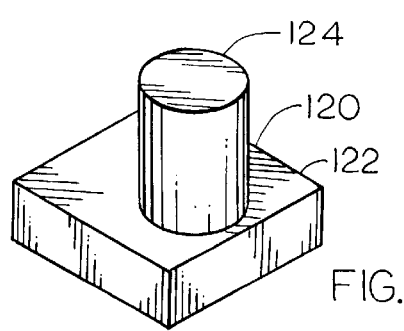

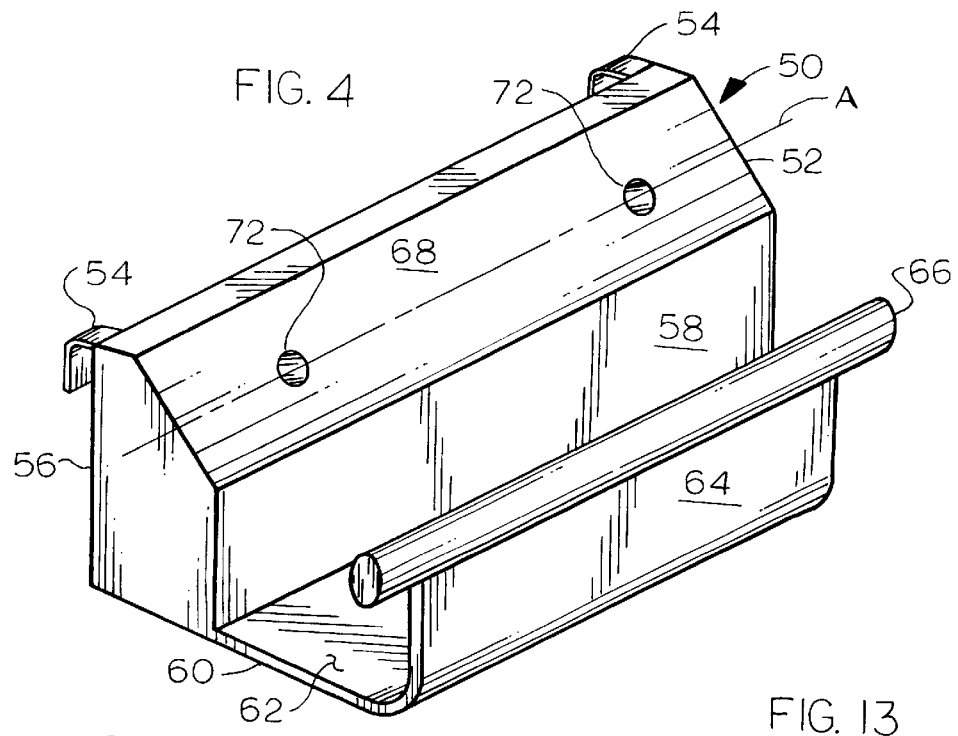
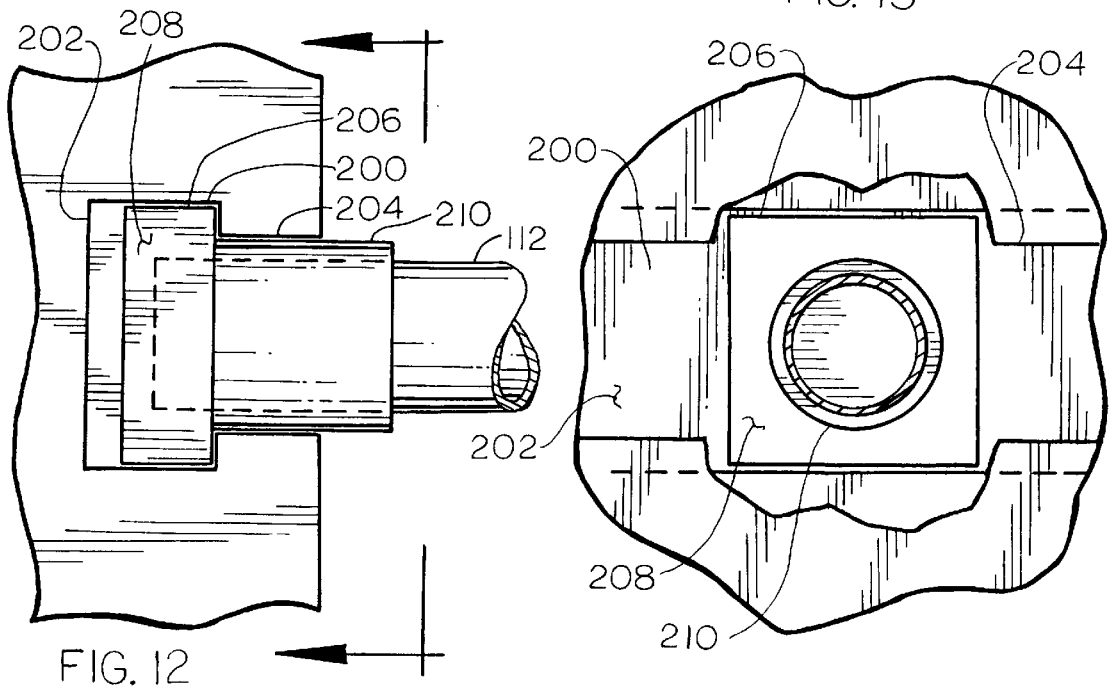
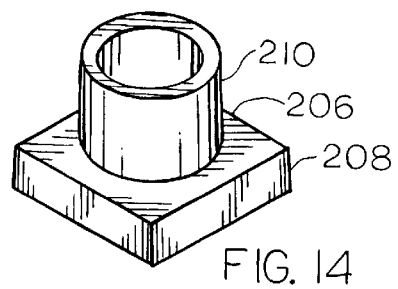

BIRD FEED HOLDER

RELATED APPLICATIONS

This is a continuation of U. S. patent application Ser. No. 08/391,596 filed on 21 Feb. 1995 now abandoned the content of which is incorporated herein by reference.

FIELD OF THE INVENTION

This invention relates generally to bird feed holders, and more particularly, to an improved bird feed holder for supporting a bird treat in a horizontal position in an aviary or birdcage.

DESCRIPTION OF RELATED ART

As is well known in the art, and as specifically set forth in U.S. Pat. No. 5,277,147 to Dupuis et al, millet is a popular feed for birds. Millet comes in a variety of forms such as loose seed, molded shapes including bells, pine cones and elongated honey sticks, and in sprays having bunches of seeds still attached to a stem. The molded millet and sprays of millet are especially popular as a feed for caged birds in aviaries and birdcages, and are commonly known as "bird treats."

Bird treats are typically supported within a bird cage adjacent a perch at a relatively high position, or suspended within the bird cage by a string or a clip that engages a portion of the bird treat and a portion of the wire wall of the birdcage. In addition, as disclosed in U.S. Pat. No. 5,277,147, a bird feed holder may include a plate and a clip supporting the plate within a cage, and a mechanism securing a bird treat to this plate and for rotating the bird treat with respect to the plate, together with a shield on the plate for preventing waste separated from the treat from leaving the cage.

However, at least one of the problems resulting from using the known devices for supporting a bird treat within the cage is that the bird treat must be placed close to an existing perch, or the bird within the cage cannot easily feed on the bird treat.

Other problems occur since the known bird treat holders support the bird treat in a vertical position that does not always allow a caged bird easy access to all of the treat, or supports the bird treat in such a position that it allows the treat to be reached by wild birds outside of the aviary or cage. Furthermore, many of the known prior art bird feed holders do not allow the treat to be easily inserted into or removed therefrom, or for a bird to easily feed on all of the treat held therein, without having to turn or realign the treat in the holders.

U.S. Pat. No. 992,167 to Cousin, discloses a bird feed holder or food receptacles for use in birdcages in which crackers or the like are in a V-shaped trough, with a perch extending from the top of the trough mounted in front of the of the trough. U.S. Pat. No. 1,537,615 to McConnell, discloses a bird feed holder having two spring clips, one affixed to the side of the bird cage, and the other holding the bird feed in the cage. U.S. Pat. No. 2,504,282 to Tobias, discloses a combination bird feeder and perch having a spring loaded wire mesh holding the bird feed. U.S. Pat. No. 2,717,577 to Petsche, discloses a portable perch that may be fixed to a mirror or the like by a suction cup. And, U.S. Pat. No. 3,199,372 to Gantz, discloses a combination perch and feeder device having spring clip means to both hold the feeder to the cage and support a bird treat between portion of the perch.

However, none of the available feeders or holders are capable of being easily assembled and mounted in a birdcage or aviary, for holding a bird treat, such as a millet spray, in a horizontal position where it's entire surface is more easily accessible to a caged bird, together with a perch, and in which the bird treat is held in a substantially horizontal position by clip holders which may be adjustably mounted in the holder and which keep the bird treat out of the reach of wild birds, outside of the aviary or cage.

SUMMARY OF THE INVENTION

Accordingly, it is a general object of the present invention to provide an improved bird feed holder. It is a particular object of the present invention to provide an improved bird feed holder for an aviary or bird cage which is adapted to hold a bird treat in a position that allows caged birds easy access to the entire treat. It is a still more particular object of the present invention to provide an improved millet spray holder for horizontally supporting the millet spray via a holding means which firmly grips the stem of the spray. It is yet a more particular object of the present invention to provide an improved bird feed holder having adjustable clip means for holding different size bird treats horizontally therein. It is a further particular object of the present invention to provide an improved spray millet holder having an integral parallel perch. It is still another particular object of the present invention to provide an improved bird feed holder having adjustable clips for supporting a bird treat horizontally therein, together with an integral parallel perch, allowing birds to sit either on or in front of the millet spray. It is yet a further particular object of the present invention to provide an improved bird feed holder for supporting a spray of millet via adjustable clips which hold the millet spray at an angle, well away from the sides of an aviary or cage in which it is supported to prevent wild birds outside of the aviary or cage from reaching the millet spray.

In accordance with one aspect of the present invention, there is provided an improved bird feed holder having an elongated main body with mounting means secured to the back of the body for attaching the holder to the walls of an aviary or birdcage. The body includes a plurality of holding means protruding from a surface of the body for supporting a bird treat, and an integral perch mounted parallel to the body to enable birds to easily rest on the perch while eating the bird treat.

BRIEF DESCRIPTION OF DRAWINGS

The objects and features of the present invention, which are believed to be novel, are set forth with particularity in the appended claims. The present invention, both as to its organization and manner of operation, together with further objectives and advantages, may best be understood by reference to the following description, taken in connection with the accompanying drawings, in which:

FIG. 1 is a front perspective view of an improved bird feed holder of the present invention shown mounted to a wall of an aviary or birdcage, with one of the holding clips removed therefrom for illustrative purposes;

FIG. 2 is a side elevational view of the bird feed holder of FIG. 1; and

FIG. 3 is a partial perspective view of the bird feed holder of FIG. 1, with a bird treat, comprising a millet spray held in a pair of holding clips and supporting the same in a substantially horizontal position, with respect to the holder.

FIG. 4 is an alternative construction of the invention.

FIG. 8 is another alternative construction of the invention.

FIG. 9 is a detailed view of the alternative construction of FIG. 8.

FIG. 10 is a detailed view of the alternative construction of FIG. 8.

FIG. 11A is a detailed view of the alternative construction of FIG. 8.

FIG. 11B is a detailed view of the alternative construction of FIG. 8.

FIG. 12 is an another alternative construction of the invention.

FIG. 13 is a detailed view of the alternative invention of FIG. 12.

FIG. 14 is a detailed view of the alternative construction of FIG. 13.

DETAILED DESCRIPTION

Figure 5:
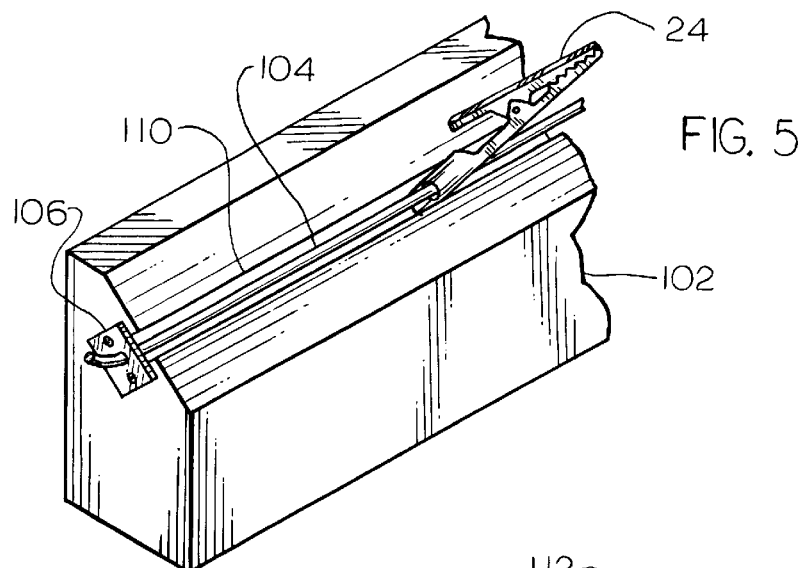
FIG. 5 is a further alternative construction of the invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to describe an improved bird feed holder, and more specifically, an improved bird feed holder for bird treats, identified generally at 10.

Turning now to the figures of the drawing, the preferred embodiment of the bird feed holder 10 is shown inserted in an aviary or birdcage 12, and secured to or supported by a wire wall thereof, a partial portion of which is shown at 12. The holder includes a main body 14, having hanging or securing means 16 mounted on a rear surface 15 thereof, to enable the body to be attached to or hung on the wire wall 12, in a substantially horizontal position. The main body 14 is preferably elongated, and includes two ends, a top, a bottom, the rear surface 15 and a front surface 17, preferably formed so as to be substantially parallel to the rear surface 15. A plurality of protruding members 18 extend from front surface 17, away from the rear surface of body 14. The protruding members may take the form of spars, and are securely attached at one end in openings formed in front surface 17. The other end of each of the spars 18 is secured to and supports a perch 22, in a position, spaced from, and substantially parallel to, the front surface 17 and main body 14. Depending on the size of the main body 14, holding means 24 may extend horizontally from openings 26 formed in the front surface 17, or vertically from openings 26 formed in top surface. However, preferably a further surface 20 is formed toward the top of the main body 14, extending between the front surface 17 and the rear 11, so as to form an angled surface. This angled surface 20 has a plurality of the holding means 24, such as spring loaded holding clips, held within the openings 26 formed therein, and is preferably formed at an angle of between 30 to 60 degrees, and is shown for purposes of illustration only and not by way of limitation, as extending an angle of 45 degrees from the front surface 17 toward the rear surface 15.

While the angled surface 20 includes at least two openings 26 formed therein, the number of openings actually formed within the angled surface 20, or the front surface or top, if desired, will depend on the length of main body 14, and the length of a bird treat 25, such as spray millet shown in FIG. 3, to be supported thereon, in a substantially horizontal position with respect to the main body 14. At least two holding means 24 are needed and removably held in the at least two openings 26, although more holding means could be used, if desired, to enable the holding means to support a stem, or the like, 27 of a bird treat in the horizontal position (see FIG. 3). Furthermore, in larger bird feeders, in which varying length bird treats are to be supported, the angled surface 20, preferably includes a plurality of openings in the angled surface 20 to allow the holding means 24 to be selectively and adjustably positioned therealong. That is, the holding means 24 are placed within various openings 26 to hold various lengths of bird treats, such as spray millet, by the stalk or stem 27.

If desired or necessary, the perch 22 and spars 18 could be removed from the main body, if insufficient room is provided in a birdcage. In such a situation, the holder 10 would either have to be large enough to support a bird, or placed close enough to an existing perch to enable a bird to reach the same. Additionally, other types of holding means 24, such as small spikes, or the like, for support pieces of fruit or other bird feed, could be used.

As shown in FIG. 3, with the angled surface 20 at an angle of 45 degrees, the bird treat 25 will be held horizontally by the holding means 24, toward the perch 22, and away from the wall 11 of the aviary or cage. This position, prevents wild birds outside of the aviary or cage from reaching the treat 25, while allowing easy access by any birds on the treat 25 or perch 22. Furthermore, with the holder 10 of the present invention, the holding means 24 supports the treat 25, horizontally, in such a manner, so as to leave all of the treat 25, such as the seeds in spray millet, accessible thereby allowing any bird sitting on the spray, or in front of the spray on the perch, to easily feed thereon, without requiring rotation or repositioning of the treat to reach unaccessible portions thereof, such as is required in prior art devices.

It, therefore, can be seen that there has been disclosed an improved bird feed holder for holding bird treats, such as millet spray, in a horizontal position so as to place the treat in the most accessible position for birds on a perch formed to holder and spaced from the horizontally held treat.

An alternative embodiment of the bird feed holder is shown in FIG. 4. This configuration, like the ones described above could be made of a variety of materials, and particularly could be made of plastic. The bird feed holder 50 has an elongated body 52, hanging or securing means 54 mounted on a rear surface 56 to enable the feed holder to be attached to or hung on a wire wall in a substantially horizontal position. The body 52 has two ends, a top, a bottom, a rear surface 56 and a front surface 58, preferably formed so as to be substantially parallel to the rear surface. A rib 60 has a first portion 62 which extends from the body 52 away from the rear surface 56 for a selected distance, and turning upwardly to a second portion 64 terminating in a perch 66. The dimensions of the portions 62 and 64 will position the perch in a desired orientation relative to the body 52, and substantially parallel with the front surface 56. An angled surface 68 is formed extending between the top and front surface 58, the angled surface 68 facing outwardly and upwardly. The angled surface 68 has a plurality of releasable holding means such as alligator type spring clips 24 (shown in FIGS. 1, 2 and 3) held within the openings 72 formed in the angled surface 68. The orientation of the perch relative to the body and the spring clips is such as to allow a bird to perch on the perch and conveniently reach a bird treat in the form of a millet spray or the like suspended at its ends between the clips. In one configuration the perch will be 1¼ inch laterally spaced from the end of the clips and 2 inches below the ends of the clips. Of course these dimensions will vary depending on the size of the bird.

The rib 60 as shown extends the full length of the body 52. But, it could be formed as two or more spaced apart narrower ribs, or as a single narrow rib located, for example, centrally of the body but not the full length of the body. This configuration could be made from plastic with the alligator type spring clips 24 pressed into the holes 72. Alternatively, a series of several holes could be provided to accept the spring clips 24 at selected locations preferably along a line parallel to the perch 66 as shown by line A.

It is recognized that the device will commonly be hung inside a cage whose wire wall will have horizontally extending wires. Therefore, the securing means can be simple hooks spaced apart and aligned horizontally to fit over the horizontal wire. But, whether for bird cages having wire walls or any other location, the securing means can be so constructed and located that the bird treat, such as millet spray, will be held horizontally and the perch will also be horizontal. Basically, the construction should set the spring clips 24 in spaced apart horizontal alignment. The axis of a millet spray 25 is depicted in FIG. 3 by a stem 27 and line B. Of course, the precise position of line B depends on how the millet spray is placed in the spring clips 24. But the placement is such as to provide the desired distance from the perch 22 (FIG. 3) and 60 (FIG. 4).

Figure 6:
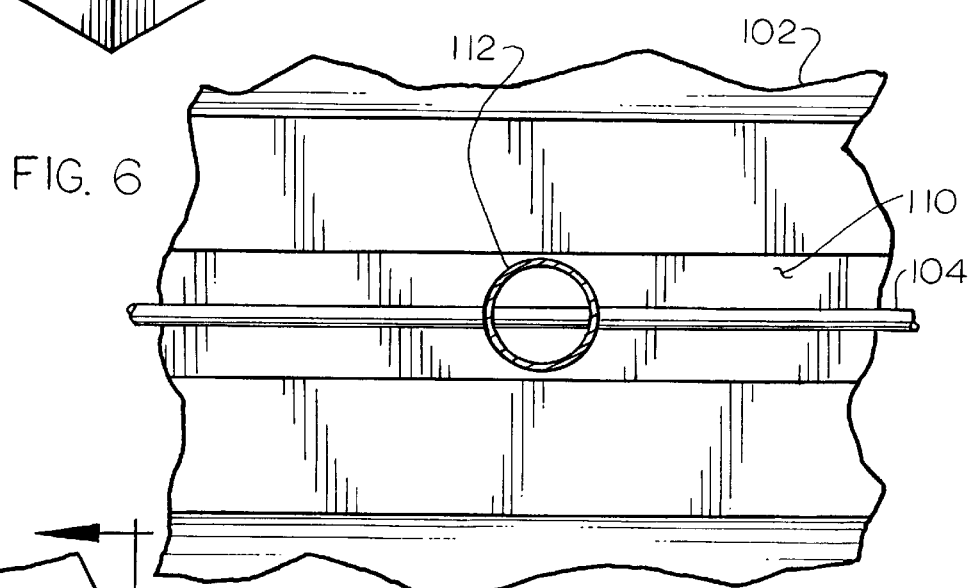
FIG. 6 is a detailed view of the alternative construction of FIG. 5.
Figure 7:
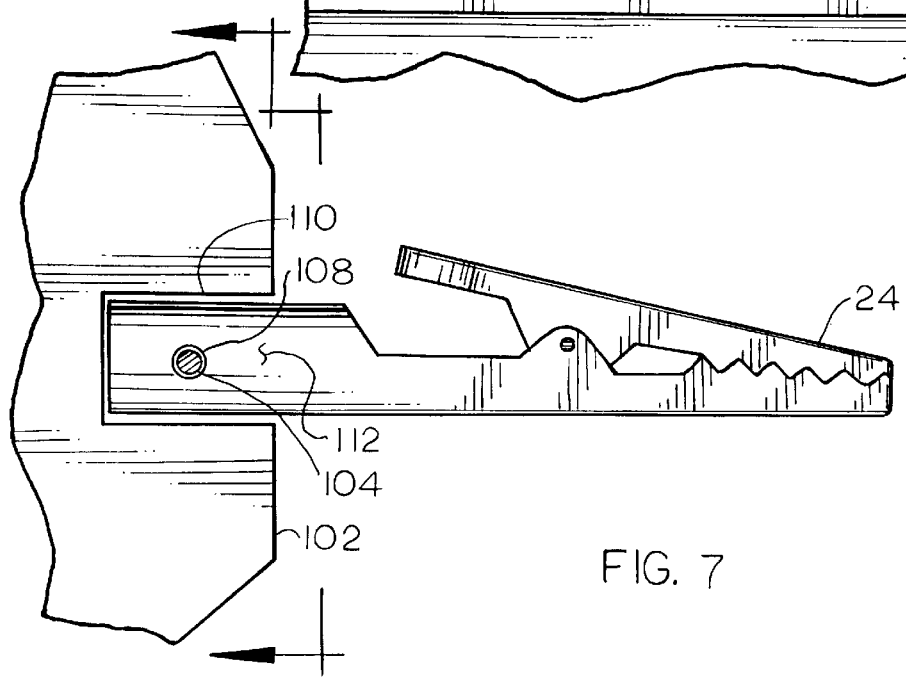
FIG. 7 is a detailed view of the alternative construction of FIG. 5.

FIGS. 5, 6 and 7 show another embodiment of the means for mounting the spring clips 24 on the body. In this embodiment the spring clips 24 are fitted in the body 102 to be slidable along a bar 104 which is fixed at each end of the body 102 by any means such as a plate 106. The spring clips have a hole 108 through which the bar 104 passes. The body 102 has a slot 110 in which the bar 104 resides. The slot 110 is dimensioned as shown in FIGS. 6 and 7, so as to accept the rear or terminal portion 112 of the spring clips 24 loosely enough that the clips 24 can slide easily along the bar 104, but closely enough that the clips 24 are maintained in relatively steady position for holding a millet spray or the like, absent undesirable floppiness. In practice, at least two spring clips 24 are mounted on the bar 104 in the slot 110 thus being aligned so that the millet spray will be horizontal.

FIG. 8, 9, 10 and 11 show a variation of the means for mounting the spring clips 24 on the body 102 using a slot 114 but absent the bar 104. In this case the slot 114 has an inner chamber 116 and an outer chamber 118. At least a portion of the inner chamber 116 is wider than the outer chamber 118. Adapter 120 has a portion 122 which slidingly mates to the inner chamber 116 and a pin portion 124 which extends at least into the outer chamber 118. The adapter 120, preferably of plastic, has its pin portion 124 inserted into and held by friction in the terminal portion 112 of the spring clip 24.

FIGS. 12, 13 and 14 show another variation in which the slot 200 has a T shape in which portion 202 is the inner chamber and portion 204 is the outer chamber. The adapter 206 has a portion 208 slidingly fitted into the slot portion 202 and a pin portion 210 slidingly fitted into the slot portion 204. In this case the pin portion 210 is a tube, so that the terminal portion 112 of the spring clip 24 can be pressed inside it; but the reverse arrangement as shown in FIG. 10 is also available.

Figure 15:
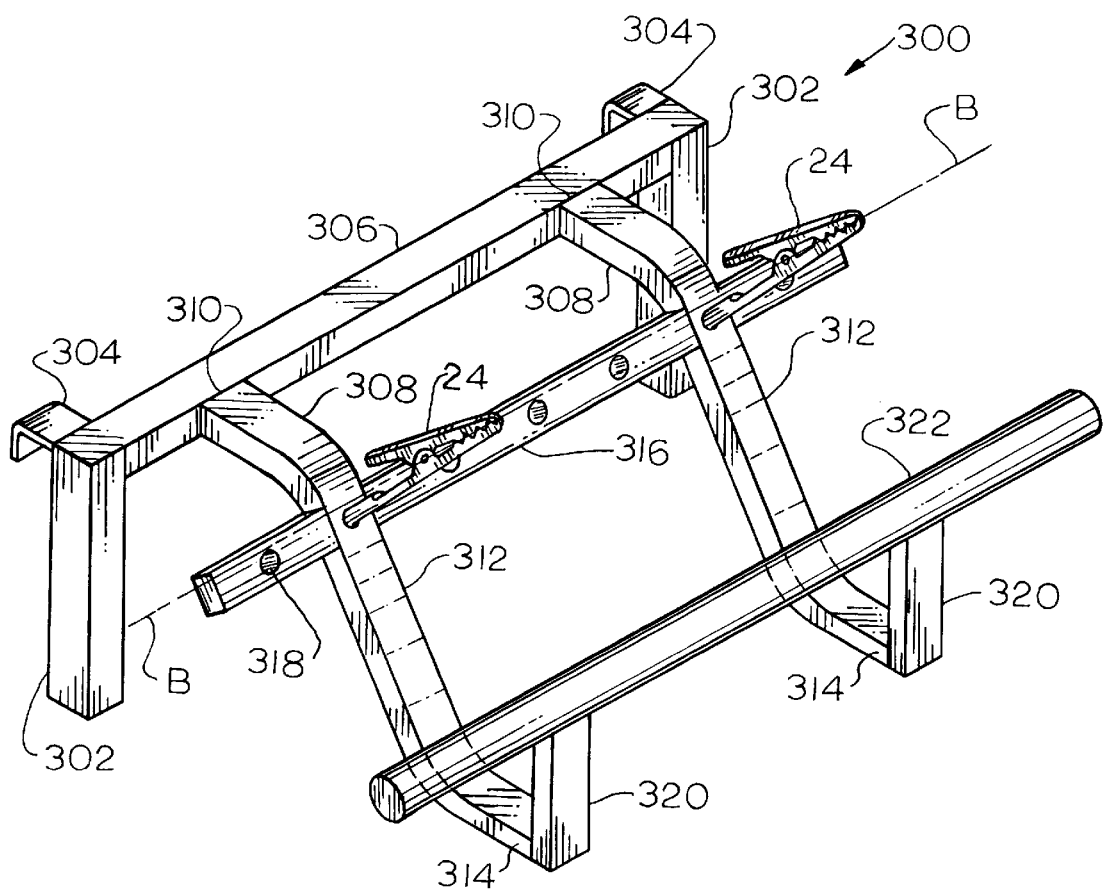
FIG. 15 is an another alternative construction of the invention.

FIG. 15 shows another alternative embodiment 300. In this embodiment pendant legs 302 are parallel and spaced apart with hooks 304 near their upper ends. The cross bar 306 extends between the legs 302. Parallel bars 308 extend in parallel planes, beginning at upper ends 310 from the cross bar 306, are spaced apart extend horizontally and then bend downwardly to terminate at lower ends 314. Intermediate the ends of bars 308 is a spar 316 which has holes 318. The spar 316 with its holes 318 will hold spring clips 24 at selected spaced apart positions and by retaining a bird treat, establishing the line B as defined above. Struts 320 extend upwardly from the lower ends 314 on the upper ends of which is a perch 322 running parallel to the line B.

Therefore to generalize the above descriptions, the holding means are spaced-apart and aligned generally to provide a gripping line such as line B. That is, the bird treat as shown in FIG. 1 will extend along line B. The securing means will permit line B to be horizontal when the device is installed. Therefore, with a bird treat such as millet spray, with end stems, held by the holding means, the millet spray will be horizontal as will the bird perch.

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. A bird feed holder for supporting a bird treat having spaced apart end portions and feed material between said spaced apart end portions comprising;

securing means for securing said bird feed holder to a selected structure;

aligned holder means including at least two holder elements horizontally aligned and spaced apart and defining a horizontal space between the holder elements said holder means and said securing means being structurally connected to position bird treat end portions on said holder elements at spaced apart positions in a substantially horizontal orientation with said bird treat held substantially within said horizontal space; and an elongated bird perch extending substantially horizontally parallel to said horizontal space between said holder elements.

2. The bird feed holder of claim 1 further including means for varying the distance between said holder elements.

3. The bird feed holder of claim 2 wherein said means for varying the distance between said holder elements comprises a plurality of receptacles spaced apart along a horizontal line and means on said holder elements to be received in said receptacles.

4. The bird feed holder of claim 2 wherein said means for varying the distance between said holder elements comprises a horizontally extending structure and a horizontally extending slot in said structure and means for said holder elements to be slidingly retained in said slot at selected positions.

5. A bird feed holder for supporting in a bird cage and spaced away from the side of the bird cage a bird treat having spaced apart support ends and feed material intermediate said spaced apart support ends comprising;

securing means for securing said bird feed holder to the side of a bird cage with the bird treat spaced away from the side of the bird cage;

horizontally aligned and spaced apart holder elements adapted to hold said support ends, said holder elements defining a horizontal space extending between them; and an elongated bird perch extending parallel to said holder elements and extending horizontally.

6. A method of horizontally presenting an elongated bird treat, said bird treat having end support elements, with a bird feed portion extending between the end support elements comprising;

providing a base structure;

said base structure having retaining structure for retaining two holder elements in spaced apart relationship;

providing two holder elements retained in said retaining structure in spaced apart relationship for supporting said end support elements so that the bird feed portion extends and is held between the holder elements;

providing a bird perch attached to or as part of the base structure extending to be generally parallel to the elongated bird treat when the bird treat is supported on the holder elements;

providing securing elements for securing the base structure to a selected other structure in such orientation that the holder elements will support the elongated bird treat generally horizontally; and holding each end support element in a respective one of said holder elements.

7. The method of claim 6 wherein said retaining structure for retaining holder elements in spaced apart relationship includes structure for varying the distance between the two holder elements.

8. The method of claim 7 wherein said structure for varying the distance between the two holder elements includes discrete structure for selecting discrete distances.

9. The method of claim 8 wherein said discrete structure comprises aligned receptacles for receiving a mounting portion of said holder elements and wherein said holder elements have a mounting portion receivable in said receptacles.

10. The method of claim 9 wherein said discrete structure is a portion of said base structure having said receptacles spaced and aligned along a line of said portion.

11. The method of claim 10 wherein said holder elements are alligator clips.

12. The method of claim 11 wherein said structure for varying the distance between the two holder elements comprises a slot for slidingly receiving mounting portions of said holder elements.

13. A bird feed holder for supporting a bird treat in a bird cage, comprising, in combination:

an elongated body having two ends, a bottom, a top, a front surface, a rear surface and an angled surface connected to said front surface and sloping away from said front surface toward said rear surface;

a plurality of openings formed in said elongated body along said angled surface; and a plurality of securing means for securing said elongated body to a cage, mounted to said rear surface of said elongated body;

said front surface of said elongated body being formed substantially parallel to said rear surface;

a plurality of holding means, for supporting a bird treat, removably secured within said plurality of openings, said plurality of holding means supporting said bird treat in a position substantially parallel to said elongated body, above said angled surface.

14. The bird feed holder of claim 13 wherein there are at least two of said holding means and at least two of said openings formed in said elongated body, with said at least two holding means removably captured in said at least two openings.

15. The bird feed holder of claim 14 wherein said at least two holding means comprise adjustable holding clips adapted to hold a bird treat therein in a horizontal position with respect to said elongated body.

16. The bird feed holder of claim 13, further including a plurality of supporting members attached to said front surface of said elongated body, said supporting members supporting a perch, spaced from and substantially parallel to said front surface of said elongated body.

17. The bird feed holder of claim 16 wherein there are at least two holding means removably secured within at least two openings formed in said angled surface.

18. The bird feed holder of claim 17 wherein said at least two holding means comprise adjustable holding clips adapted to removably hold a stem of a spray millet therein, in a horizontal position with respect to said elongated body.

19. The bird feed holder of claim 17 wherein said angled surface extends at an angle of between 30 to 60 degrees, with respect to said bottom of said elongated body.

20. The bird feed holder of claim 19 wherein said plurality of securing means secured to said rear surface of said elongated body are hooks for hanging said bird feed holder on a wire wall of said bird cage in a substantially horizontal position, with respect to a base of said bird cage.

21. The bird feed holder of claim 20 wherein said angled surface extends at an angle of approximately 45 degrees, with respect to said bottom of said elongated body.

22. A bird feed holder for holding various size sprays of millet within a bird enclosure comprising, in combination:

an elongated main body having two ends, a front surface and a rear surface, with said rear surface being substantially parallel to said front surface;

a plurality of hook means secured to said rear surface for mounting said elongated body on a wire wall of said bird enclosure in a substantially horizontal position, with respect to a base of said bird enclosures;

a plurality of spars secured to said front surface and extending from said front surface, away from said rear surface, for a predetermined distance;

a perch secured to outer ends of said plurality of spars in a position substantially parallel to said front surface;

an angled surface formed on said elongated body extending from said front surface, toward said rear surface at an angle between 30 degrees and 60 degrees, with respect to said bottom of said elongated body;

a plurality of openings formed in said angle surface;

a plurality of holding means removably secured within said plurality of openings and extending from said angled surface at an angle, away from said rear surface, and capable of being selectively mounted in said plurality of openings to hold various size sprays of millet in a substantial horizontal position with respect to said elongated body.

23. A bird feed holder for holding a bird treat within a bird cage comprising, in combination:

an elongated main body having two ends, a front surface and a rear surface, with said rear surface being substantially parallel to said front surface;

a plurality of hook means secured to said rear surface for mounting said elongated body on a wire wall of said bird cage in a substantially horizontal position, with respect to a base of said bird cage;

a plurality of spars secured to said front surface and extending from said front surface, away from said rear surface, for a predetermined distance;

a perch secured to outer ends of said plurality of spars in a position substantially parallel to said front surface;

an angled surface formed on said elongated body extending from said front surface, toward said rear surface;

a plurality of openings formed in said angled surface;

a plurality of holding means secured within said plurality of openings and extending from said angled surface at an angle, away from said rear surface.

24. The bird feed holder of claim 23 wherein said angled surface extends at an angle of between 30 to 60 degrees, with respect to said bottom of said elongated body.

25. The bird feed holder of claim 24, wherein there are two holding means, and each is a holding clip including biasing means to enable said clip to be opened and firmly hold a stem of said spray millet therein.

26. The bird feed holder of claim 25 wherein there are at least two openings in said angled surface of said front face of said elongated body.

27. A bird feed holder for supporting a bird treat in a bird cage, comprising, in combination:

an elongated body having two ends, a bottom, a top, a front surface and a rear surface;

a plurality of securing means for securing said elongated body to a cage, mounted to said rear surface of said elongated body;

said front surface of said elongated body being formed substantially parallel to said rear surface;

a plurality of openings formed in said elongated body;

a plurality of adjustable holding clips, for supporting a bird treat, removably secured within said openings to support said bird treat in a position which is horizontal and substantially parallel to said elongated body, and a plurality of supporting members attached to said front surface, said supporting members supporting a perch, spaced from and substantially parallel to said front surface of said elongated body.

28. The bird feed holder of claim 27 wherein said plurality of securing means secured to said rear surface of said elongated body are hooks for hanging said bird feed holder on a wire wall of said bird cage in a substantially horizontal position, with respect to a base of said bird cage.

29. The bird feed holder of claim 27 wherein said angled surface extends at an angle of between 30 to 60 degrees, with respect to said bottom of said elongated body.

30. A bird feed holder for horizontally presenting an elongated bird treat having end support elements and a middle portion having thereon bird feed comprising;

an elongated base structure having a front and a rear, said base structure having retaining structure for retaining two holder elements in spaced apart relationship, defining a horizontal space between them;

at least one hanger secured to the rear of the base structure for mounting the bird feed holder on a wall of a bird cage with the front facing into the cage;

a perch attached to the base structure and extending horizontally spaced away from the front of the base structure;

two horizontally aligned holding elements attached to the base structure and spaced away from the front of the base structure, defining a horizontal space between them spaced away from the front of the base structure.

31. The bird feed holder of claim 30 wherein the holding elements are attachable to the base structure at positions selectable from a plurality of predetermined positions.

32. The bird feed holder of claim 31 wherein the holding elements are spring clips and they are attached to the main body by being placed each in a hole in the base structure, selected from a number of holes arranged in a horizontal line.

33. The bird feed holder of claim 30 wherein the holding elements are horizontally movably attached to the main body to variable selectable positions.

34. The bird feed holder of claim 33 wherein the holding elements are spring clips and they are attached to the base structure by being held in a slot and can be moved in the slot to selected locations.

35. A bird feed holder for holding in a horizontal position a bird treat having spaced apart end portions and a middle portion having thereon bird feed comprising;

an elongate base structure having a front and a rear;

hanging means attached to the base structure for positioning the elongate dimension of the base structure horizontally;

two legs extending parallel and spaced apart from the front of the base structure and having a middle portion and terminal ends distal from the base structure;

a perch attached proximate the distal ends of two legs, extending horizontally;

two spaced apart holding elements each supported on one of said legs and aligned to define a horizontal space between them.

36. The bird feed holder of claim 35 further comprising a cross bar extending horizontally and attached to the legs, the holding means being attached to the cross bar.

* * * * *

UNITED STATES PATENT AND TRADEMARK OFFICE
CERTIFICATE OF CORRECTION

PATENT NO. : 5,806,459
DATED : 09/15/98
INVENTOR(S) : Philip A. Hayes

It is certified that error appears in the above-identified patent and that said Letters Patent is hereby corrected as shown below:

Column 3, line 60: change "rear 11" to -- rear 15 --.

Column 4, line 26: change "support" to -- supporting --.

Column 4, line 31: change "wall 11" to -- wall 12 --.

Column 4, line 62: change "surface 56" to -- surface 58 --.

Signed and Sealed this

Twenty-second Day of June, 1999

Attest:

Q. TODD DICKINSON

*Attesting Officer*  *Acting Commissioner of Patents and Trademarks*